United States
Vogt et al.

[11] 3,640,123
[45] Feb. 8, 1972

[54] APPARATUS FOR NONDESTRUCTIVE MATERIALS TESTING OF CONTINUOUSLY ADVANCED WORKPIECES

[72] Inventors: Herbert Vogt, Dechant-Linden-Weg 31, 5042 Liblar; Helmut Pause, Gotenring 59, 5 Cologne-Deutz, both of Germany

[22] Filed: Mar. 21, 1969

[21] Appl. No.: 809,240

[52] U.S. Cl. ................................73/71.5, 73/67.8
[51] Int. Cl. ........................................G01n 29/04
[58] Field of Search ..................73/67.5–67.9, 69, 73/71.5

[56] References Cited

UNITED STATES PATENTS

| | | | |
|---|---|---|---|
| 2,678,559 | 5/1954 | Drake | 73/67.8 |
| 3,121,325 | 2/1964 | Rankin et al. | 73/67.8 X |
| 3,183,709 | 5/1965 | Rankin et al. | 73/67.5 |
| 3,327,523 | 6/1967 | Kelemencky et al. | 73/71.5 |

*Primary Examiner*—Charles A. Ruehl
*Attorney*—Steinberg and Blake

[57] ABSTRACT

An apparatus for nondestructive materials testing of continuously advanced workpieces of preferably oblong shape. This apparatus has at least one holder, in order to support an ultrasonic transducer. The holder is mounted in the throughfeed section to transmit and receive, respectively, testing signals, to and from said workpiece. Further, pressure structure is provided for pressing the transducer against the workpiece, to provide a measurement coupling of the transducer with the workpiece, when latter is passing said transducer. The holder is provided with at least one funnel-type inlet throughfeed to adjust the direction of the workpiece with respect to the holder. There is at least one movably supported guide which is arranged ahead of the transducer holder. In order to guide the workpiece, when passing the transducer a spring structure is provided also for pushing the guide into the throughpassing space and against the throughpassing workpiece. The resilient structure is arranged around the perimeter of the guide in order to have an equal distribution of resilient forces on the guide.

12 Claims, 3 Drawing Figures

PATENTED FEB 8 1972

3,640,123

Inventors:
HERBERT VOGT
HELMUT PAUSE

Steinberg & Blake
ATTORNEYS

APPARATUS FOR NONDESTRUCTIVE MATERIALS TESTING OF CONTINUOUSLY ADVANCED WORKPIECES

BACKGROUND OF THE INVENTION

In nondestructive materials testing acoustic, magnetic or electric forces are to be transmitted to the workpiece under test, these forces, as a rule, being kept constant as to their relative position related to the work piece. Particularly, in ultrasonic materials testing by means of the pulse transit time method the sound field should be aligned to the workpiece in a definite way, e.g., the sound beam should impinge perpendicularly and/or at one or several discrete angles related to the specimen surface. Moreover, the distance between the source of sound and the workpiece should be constant. With nonstraight objects travelling a not precisely defined course guidance of the probes, also denoted transducers, by the specimen itself is absolutely necessary.

It is known, indeed, for this purpose to mount the transducers into holders, which slide or roll on the specimen, the holder being pressed against the specimen in such a manner that it can followup all movements of the specimen. The particularly critical phases of testing are positioning and clearing of the holder, the requirement being to accomplish the test procedure if possible from the leading to the trailing end of the workpiece so that no or only short nontested ends remain. For this purpose it is known to equip the holder with approach and runoff runners. Nevertheless, all known devices provided to position on and to follow the irregular movement of an advanced specimen exhibit the disadvantage that unequally long positioning and clearing distances are caused by the different positions of the specimen, and that due to the holder inertia the acceleration time for positioning and clearing is finite. Due to this, the nontested ends of the specimen exhibit different lengths, and proper seating on the specimen is discontinued upon positioning the holder when there is fast specimen advancement. Such discontinuities might also occur due to rebounding of the probe holder upon positioning.

SUMMARY OF THE INVENTION

It is accordingly a primary object of the present invention to provide apparatus for nondestructive materials testing of the above general type which eliminates the problems and drawbacks which are unavoidable in conventional apparatus.

Thus, it is an object of the present invention to provide an apparatus for nondestructive materials testing of continuously advanced workpieces of preferably oblong-type shape in which positioning distances are made more equal.

It is also an object of the present invention to provide an apparatus in which the clearing distances between specimen and the apparatus will be reduced. It is also an object of the present invention to provide an apparatus in which the clearing distances between specimen and the apparatus will be reduced.

Also, it is an of the invention to reduce and minimize the acceleration time for positioning as well as for clearing.

In accordance with the invention, the disadvantages are eliminated by equipping the apparatus ahead of the transducer holder with an inlet and throughlet funnel and at least one movably supported structural guide means or member, the latter being pushed into the throughlet, and pressed against the advancing workpiece by resilient or spring elements or devices arranged at its perimeter, with particular consideration of concentric displacement and of equal resilient or spring power.

By means of the funnel guidance at the specimen the maximum of the transducer holder mass is forcibly guided at the specimen. Thereby, the otherwise different positioning and clearing distances are eliminated. These distances can be kept considerably shorter. Moreover, only the spring mounted device in the funnel neck is subjected to the inertia upon fast specimen movements.

It is another object of the invention to have the specimen strike the transducer holder at an as small as possible angle, in order to assure that the transducer movements are reduced to a minimum, and that the transducer or the transducers with minimum delay attain their required position related to the specimen. For this purpose the press-on parts of the mechanism must open and close extremely uniformly and parallel to the specimen surfaces when the specimen passes in or out.

According to one embodiment of the invention, this can be accomplished by building the springing device so that by means of radial guides it the press-on parts of the mechanism can only have a movement parallel to the longitudinal axis of the mechanism.

Another embodiment of the invention provides that the spring forces are distributed over the length of the funnel neck, e.g., one spring bank at the inlet end and another one at the outlet end of the funnel neck. Various modifications of the apparatus are possible with the present invention. The spring banks can separately be positioned, thus being effective only where the specimen is present in the mechanism, i.e., upon passing in of the specimen only the inlet section in the funnel neck is pressed on by the appropriate spring bank. By this, the spring device is aligned to the passed in portion of the specimen. The other spring bank at the outlet of the funnel neck becomes effective only, when the leading specimen end passes the outlet. In the same way, with a passing out specimen the spring bank at the inlet end clears first, whereas the outlet end of the mechanism is guided at the specimen by the spring bank at the outlet end. This arrangement assures that the transducers arranged between the spring banks, e.g., in the middle of the mechanism, are always perpendicularly oriented to the specimen surface, and kept at a constant distance.

BRIEF DESCRIPTION OF THE DRAWINGS

The invention is illustrated by way of example in the accompanying drawings, which form part of this application and in which.

DESCRIPTION OF PREFERRED EMBODIMENTS

Figure 1:
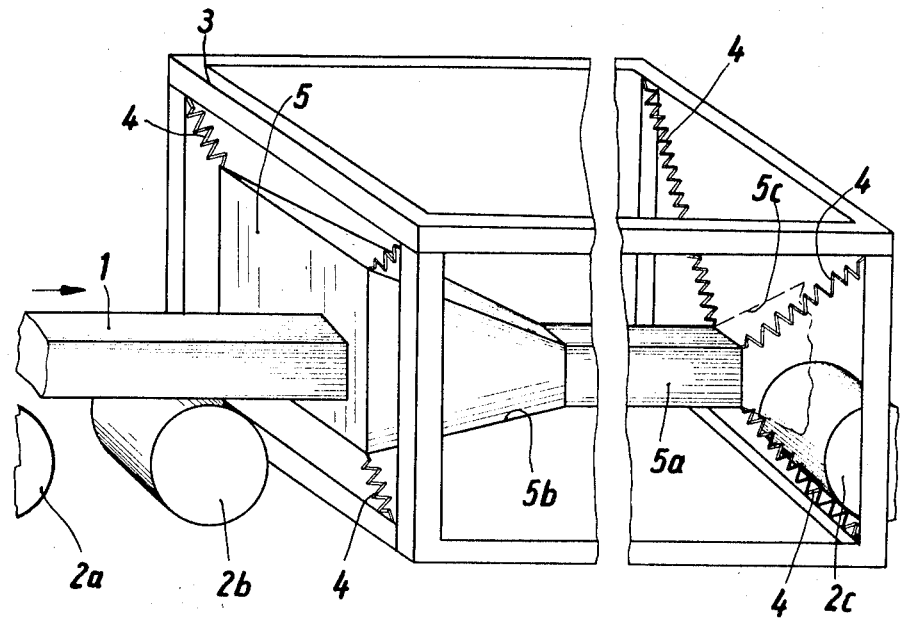
FIG. 1 is a perspective representation with a billet advanced on a roller conveyor passing into the apparatus and FIG. 2 is a longitudinal section of a portion of the funnel and of the funnel neck
Figure 2:
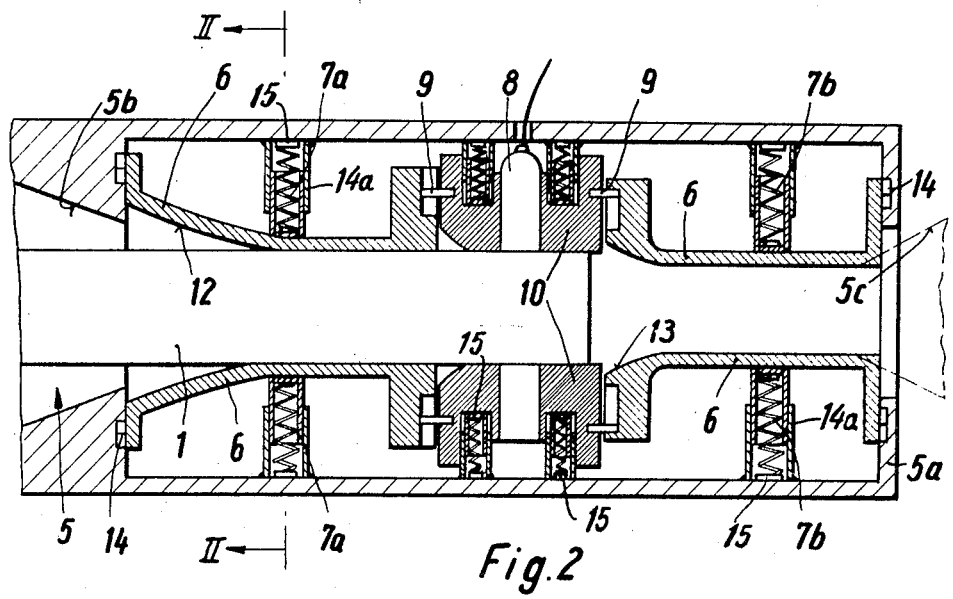

Referring to the drawings, FIG. 1, 2, a square billet 1 is advanced in arrow direction on a roller conveyor, some rollers of which, 2a, 2b, 2c, are outlined. A steel frame 3 is mounted in the roller conveyor, between the rollers 2b and 2c. A funnel 5 and a funnel neck 5a are suspended on frame 3 by resilient means, e.g., on springs 4. A passing in billet 1 pushes the funnel 5 so far to the side that the funnel neck 5a is located in front of the passing in leading billet end. In the funnel neck 5a spring-cushioned guide means, as elements 6, are arranged so that they form an opening smaller than the specimen dimensions. The elements 6 are equipped with approach runners 12 and inclined feed-in surface 13, which for friction reduction reasons may be provided with rollers. By the springs 7a and 7b, which may be arranged in banks, they are supported for spring yieldable movement. Between the spring banks they support the transducers 8, of which only one is drawn, in appropriate holders 10. If necessary, the transducers can be designed in such a manner that the outlet aperture 5b of the funnel and/or that of the springy parts is preadjusted in conformance with the workpiece under test dimensions. The elements 6 move in radial guides 14 in the housing rim of the funnel neck 5a.

The figures depict that the workpiece 1 is made to run into a funnel 5 which is movably suspended perpendicularly to the specimen axis, the workpiece pushing to the side the movable funnel when passing in, and consequently the funnel outlet 5b being placed in front of the workpiece. Subsequently, the workpiece 1 runs into the funnel neck 5a. The elements arranged in the funnel neck and exerting from all sides a spring pressure in direction of the workpiece axis produce at first a narrower inlet than the billet cross section. Upon running in, the workpiece pushes apart to all sides, the elements 6 by means of the inclined feed-in or surfaces approach up to its cross-sectional dimensions. The length of the elements is dimensioned according to the number and arrangement of the required transducers. This pertains mainly to instances of one or several gimbal mounted transducer holders.

In further development of the invention the funnel 5 may exhibit a conic cross section, and the funnel neck 5a a tubular cross section, or any other corresponding to the specimen cross section. Moreover, the test assembly might be suspended on the springs 4 so that the funnel 5 appears to be turned by 45°, referred to FIG. 1. According to the last mentioned, also specimens advanced in diamond fashion of square, rectangular or any polygonal cross section can be guided.

Figure 3:
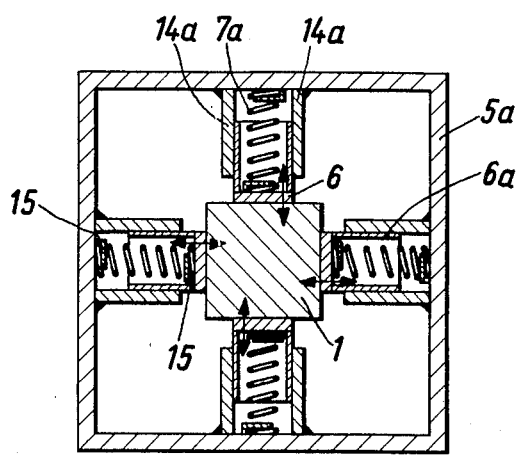
FIG. 3 is an enlarged cross section along line II—II of FIG. 2.

According to the example of FIG. 3, for the specimen 1 of rectangular cross section four elastic structural elements or guide means are mounted so that they are resiliently supported in the arrow directions between the guide bars 14a by element parts 6a. The springs 7a are compression springs, each end coil part of which is clamped a corresponding spring catch or a leg 15 projecting from the base part of neck frame 5a and elements 6. The upper vertical element 6 of FIG. 3 may be provided with a tension spring element, not shown, in order better to balance the weight of element 6. Parts 6a and 14a may be of telescope type. The springs push the elements 6 against the specimen 1. The guide bars 14a are fixed at the funnel neck frame 5a. Instead of springs, magnetic elements may be applied.

For special applications the invention is further applicable to a scanning assembly consisting of a symmetric double funnel providing for specimen throughpassing from opposite directions. This is required if a defect had been detected in the specimen. For the purpose of more thorough investigation it is desirable to have the specimen reverse through the scanning assembly.

While the invention has been described in terms of certain examples, such examples are to be construed as illustrative rather than limiting. Further embodiments and modifications will be apparent to those skilled in the art, and it is intended to cover all such embodiments and modifications that fall within the spirit and scope of the appended claims.

What is claimed is:

1. In an apparatus for nondestructive testing of continuously advanced workpieces of elongated shape, the apparatus comprising at least one holder means, transducer means mounted in said holder means to transmit and receive, respectively, testing signals to and from said workpiece, a throughfeed section to receive the advanced workpiece, means for pressing the transducer means against the workpiece for coupling said transducer means with the workpiece, the throughfeed section having at least one funnel-shaped inlet and throughfeed means to adjust the direction of the front leading end of the workpiece having at least one movably supported structural guide means which is arranged ahead of said transducer holder means to guide the workpiece when passing the transducer means, resilient means for pushing the guide means into the throughpassing space and against the advancing workpiece, said resilient means being arranged around the perimeter of said guide means to have an equal distribution of resilient force.

2. The combination of claim 1 and wherein the transducer means are ultrasonic transducer means to transmit and receive an ultrasonic signal, respectively, to and from said workpiece.

3. The combination of claim 1 and wherein the structural guide means are situated next to and support the transducer holder means.

4. The combination of claim 1 and wherein the structural guide means are situated next to and guide the transducer holder means.

5. The combination of claim 1 and wherein the structural guide means is provided with inclined feed-in surfaces.

6. The combination of claim 1 and wherein at least one structural guide means has a plurality of parts.

7. The combination of claim 1 and wherein the throughfeed section has a funnel neck extending from said inlet and wherein the structural guide means or the transducer means is arranged in the funnel neck.

8. The combination of claim 1 and wherein the structural guide means is forcibly guided in radial bearings.

9. The combination of claim 1 and wherein the throughfeed section has a spring type suspension, and a metal frame means in which said suspension is located.

10. The combination of claim 1 and wherein the throughfeed section is suspended by a spring support which is divided into two sets, one set being arranged close to the inlet, and the other one close to an outlet of the throughfeed section, each set being separately positioned by the piece under test and being retained for the duration of specimen presence in the respective position.

11. The combination of claim 1 and wherein said guide means has opposed ends between which said holder means is arranged on said guide means.

12. The combination of claim 1 and wherein said throughfeed section has an outlet equipped with at least one funnel having an inlet end of increased cross section at a side of said holder means remote from said guide means.

* * * * *